US012407081B2

(12) United States Patent
Wang et al.

(10) Patent No.: US 12,407,081 B2
(45) Date of Patent: Sep. 2, 2025

(54) MOUNTING DEVICE AND CLAMPING DEVICE FOR BASE STATION ANTENNA

(71) Applicant: Outdoor Wireless Networks LLC, Claremont, NC (US)

(72) Inventors: Zhigang Wang, Suzhou (CN); PuLiang Tang, Suzhou (CN); Maosheng Liu, Suzhou (CN); Nengbin Liu, Suzhou (CN); Chen Chen, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 17/870,086

(22) Filed: Jul. 21, 2022

(65) Prior Publication Data

US 2023/0063114 A1 Mar. 2, 2023

(30) Foreign Application Priority Data

Aug. 26, 2021 (CN) ......................... 202110985708.7

(51) Int. Cl.
*H01Q 3/06* (2006.01)
*H01Q 1/12* (2006.01)
*H01Q 1/24* (2006.01)

(52) U.S. Cl.
CPC ............... *H01Q 1/125* (2013.01); *H01Q 3/06* (2013.01); *H01Q 1/246* (2013.01)

(58) Field of Classification Search
None
See application file for complete search history.

(56) References Cited

U.S. PATENT DOCUMENTS 10,122,083 B2 * 11/2018 Kim ........................ B23P 11/00
2011/0168855 A1 * 7/2011 Bonczyk .............. H01Q 1/1242 248/201
2020/0411944 A1 * 12/2020 Lekselius ................. H01Q 3/06
2022/0140465 A1 * 5/2022 Chen .................... H01Q 1/1264 343/882

FOREIGN PATENT DOCUMENTS

CN 112448128 A * 3/2021
CN 213776049 U * 7/2021
DE 19724348 A1 * 1/1998 ............. H01Q 1/125

(Continued)

*Primary Examiner* — Dameon E Levi
*Assistant Examiner* — Anh N Ho
(74) *Attorney, Agent, or Firm* — Myers Bigel, P.A.

(57) ABSTRACT

The present application relates to a mounting device configured for mounting a base station antenna on a supporting member, and providing the adjustability of the mechanical tilt angle of the base station antenna. The mounting device includes a first mounting unit, a second mounting unit, and an elastic element. The first mounting unit is configured to provide a pivot point for the base station antenna, the second mounting unit has an adjustable effective connection length for the base station antenna, with the effective connection length related to the mechanical tilt angle of the base station antenna, and the elastic element is configured to resist an increase in the mechanical tilt angle of the base station antenna on at least a part of the adjustable range of the mechanical tilt angle of the base station antenna.

8 Claims, 4 Drawing Sheets

(56) References Cited

FOREIGN PATENT DOCUMENTS

| | | | | |
|---|---|---|---|---|
| JP | 2001292015 | A | * | 10/2001 |
| KR | 20040044426 | A | * | 5/2004 |
| KR | 101658467 | B | * | 9/2016 |
| KR | 20210021436 | A | * | 2/2021 |
| KR | 20210039994 | A | * | 4/2021 |

* cited by examiner

MOUNTING DEVICE AND CLAMPING DEVICE FOR BASE STATION ANTENNA

RELATED APPLICATION

The present application claims priority from and the benefit of Chinese Patent Application No. 202110985708.7, filed Aug. 26, 2021, the disclosure of which is hereby incorporated herein by reference in full.

FIELD OF THE INVENTION

The present application relates to a mounting device for mounting a base station antenna and a clamping device for a base station antenna. The clamping device may be, for example, an integral part of the mounting device.

BACKGROUND OF THE INVENTION

In a wireless communication system, the transmission and reception of signals can be realized by base station antennas. The position of the base station antenna is important for the wireless communication network, and may affect the coverage of the base station antenna. In the process of mounting and operating the base station antenna, it may be necessary to adjust the position of the base station antenna accordingly.

The base station antenna may have an adjustable mechanical tilt angle to meet different user needs. Typically, when adjusting the mechanical tilt, the relevant fasteners of the mounting device for mounting the base station antenna on the support member are first loosened, so that the base station antenna can pivot around the pivot point; next, the base station antenna is adjusted to the desired mechanical tilt angle; finally, the relevant fasteners are re-tightened so that the base station antenna is fixed in the desired mechanical tilt angle. The supporting member may be, for example, a holding pole or a communication tower pole. The adjustment of the mechanical tilt angle of the base station antenna is usually done by an operator.

Some base station antennas, such as 4G+5G integrated antennas, can be very heavy, and their weight can even reach or exceed 150 kilograms. The center of gravity of the base station antenna creates a moment relative to the pivot point of the base station antenna. When adjusting the mechanical tilt angle, the operator needs to apply a force to the base station antenna to overcome the aforementioned moment, which can be laborious and may be dangerous for the operator. When adjusting the mechanical tilt angle, the base station antenna may fall under the action of the moment generated by its own center of gravity.

SUMMARY OF THE INVENTION

A purpose of the present application is to propose a mounting device for a base station antenna and a clamping device for a base station antenna, thereby reducing the workload of the operator.

The first aspect of the present application relates to a mounting device configured for mounting a base station antenna on a supporting member and providing the adjustability of the mechanical tilt angle of the base station antenna. The mounting device comprises a first mounting unit, a second mounting unit, and an elastic element. The first mounting unit is configured to provide a pivot point for the base station antenna, the second mounting unit has an adjustable effective connection length for the base station antenna, with the effective connection length related to the mechanical tilt angle of the base station antenna, and the elastic element is configured to resist an increase in the mechanical tilt angle of the base station antenna on at least a part of the adjustable range of the mechanical tilt angle of the base station antenna, for example, over the entire adjustable range of the mechanical tilt angle of the base station antenna.

When a base station antenna is mounted on a supporting device such as a holding pole or a communication tower pole with the use of such a mounting device, during the adjustment of the mechanical tilt angle of the base station antenna, the restoring force of the elastic element is capable of at least partially overcoming the gravity of the base station antenna, and the restoring force of the elastic element is capable of increasing with the increase of the mechanical tilt angle.

In some embodiments, the elastic element may be a rubber component or a spring. The spring may be, for example, a tension spring, a compression spring, a torsion spring or an air spring.

In some embodiments, the elastic element may additionally have damping characteristics, or be equipped with a separate damping element, for example, it may form a spring damping system with the damping element.

In some embodiments, the elastic element may be configured as a spring device comprising two tension spring segments and a steel wire segment connecting the two tension spring segments, with the steel wire segment configured to hold the supporting member from the rear, and the spring device configured to be directly or indirectly connected to the base station antenna via two free ends.

In some embodiments, the elastic element may be provided on a first mounting unit or a second mounting unit.

In some embodiments, not only the first mounting unit but also the second mounting unit may be equipped with the elastic element.

In some embodiments, the first mounting unit may be a lower mounting unit, and the second mounting unit may be an upper mounting unit.

In some embodiments, the mounting device may comprise a third mounting unit that is capable of connecting a base station antenna and a supporting member between the first mounting unit and the second mounting unit.

In some embodiments, the elastic element may be a torsion spring, which may be installed in the hinged part of the first mounting unit or the second mounting unit.

In some embodiments, the torsion spring may be installed in a hinged part of the first mounting unit that provides a pivot point, wherein the relative movement of the two components of the first mounting unit connected through the hinged part causes the relative movement of the two spring anns of the torsion spring.

In some embodiments, the two components may have aligned mounting holes, the torsion spring may have at least one coil, the torsion spring is installed between the two components, and a pin acting as a pivot shaft may pass through the aligned mounting holes of the two components and at least one coil of the torsion spring. The pin may be, for example, a smooth pin gauge or a bolt.

In some embodiments, the two components may each have a flange, and the two spring arms of the torsion spring may be respectively blocked against the flange of one of the two components.

The second aspect of the present application relates to a clamping device for a base station antenna. The clamping device comprises at least one clamping member and at least one bolt device configured to fasten the clamping member to the supporting member for the base station antenna. At least one clamping member has a laterally open-ended mounting hole for the bolt device, and the mounting hole is configured to allow the bolt rod of the bolt device to enter and leave the mounting hole on the side when the nut of the bolt device is loosened.

In some embodiments, the clamping member may be a hoop, which may be fastened by a single bolt device at the open end.

In some embodiments, the clamping device may comprise a pair of clamping members and a pair of bolt devices, and the pair of clamping members may be clamped facing each other to the supporting member by the pair of bolt devices. In the installed state of the clamping device, the supporting member is between the pair of clamping members and between the pair of bolt devices, and one of the pair of clamping members has the laterally open-ended mounting hole.

In some embodiments, the laterally open-ended mounting hole may have an obstructing member configured to prevent the bolt rod of the bolt device from detaching from the side of the mounting hole when the bolt device is tightened.

In some embodiments, the laterally open-ended mounting hole may be equipped with at least one protrusion as an obstructing member, and the protrusion is configured such that, when the bolt device is fastened, the nut for obstruction purposes is pressed against the washer sleeved on the bolt rod of the clamping member, so that the bolt rod remains in the mounting hole.

In some embodiments, the protrusion may be a solder joint in a region of the clamping member adjacent to the mounting hole.

In some embodiments, the laterally extending channel of the laterally open-ended mounting hole may have a corner as an obstructing member.

The third aspect of the present application relates to a mounting device configured to mount a base station antenna on a supporting member. The mounting device comprises a first mounting unit and a second mounting unit, wherein the two mounting units are respectively configured to connect the base station antenna and the supporting member, and at least one of the mounting units comprises the clamping device according to the second aspect of the present application.

The clamping device according to the third aspect can be combined with the clamping device according to the first aspect.

It should be pointed out here that the above-mentioned technical features, the technical features to be mentioned below and the technical features shown separately in the attached drawings may be arbitrarily combined with each other as long as the combined technical features are not contradictory. All feasible characteristic combinations are technical contents stated herein.

BRIEF DESCRIPTION OF DRAWINGS

An exemplary embodiment of a mounting device for a base station antenna of the present disclosure will now be described with reference to the attached drawings.

SPECIFIC EMBODIMENTS

Figure 1:
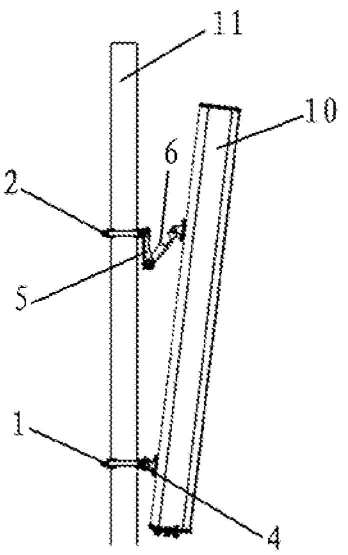
FIG. 1 is a side view of a base station antenna mounted on a supporting member via a mounting device according to a first embodiment of the present disclosure.
Figure 2:
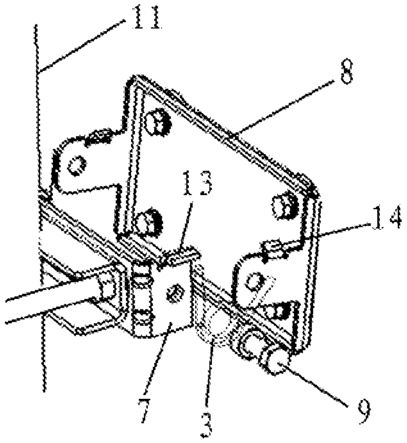
FIG. 2 is a partially enlarged, exploded perspective view of an exploded view of the first mounting unit of the mounting device according to the first embodiment.
Figure 3:
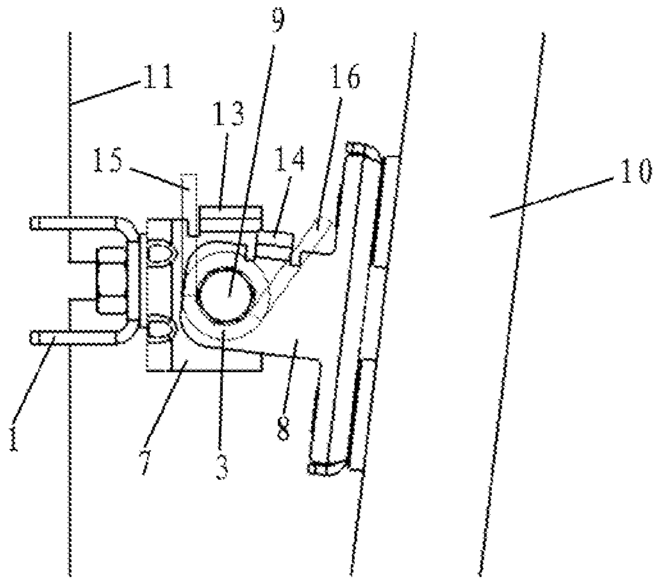
FIG. 3 is a partially enlarged side view of the system of FIG. 1 in the area of the first mounting unit.

First, the mounting device according to the first embodiment of the present disclosure is described with reference to FIG. 1 to FIG. 3, wherein FIG. 1 is a side view of a base station antenna 10 mounted on a supporting member 11 via a mounting device according to the first embodiment of the present disclosure, FIG. 2 is a partially enlarged exploded view of a first mounting unit 1 of the mounting device according to the first embodiment, and FIG. 3 is a partially enlarged view of the system of FIG. 1 in the area of the first mounting unit 1.

The base station antenna 10 may be elongated, and may have a substantially circular, elliptical, rectangular or another suitable cross-section. The base station antenna 10 may have a weight of tens of kilograms up to more than 100 kilograms. Some 4G+5G integrated base station antennas can weigh more than 150 kilograms.

The base station antenna 10 may be mounted on the supporting member 11 by an installation device, and the supporting member 11 may be, for example, a holding pole, a communication tower pole, or the like. The mounting device may include a lower first mounting unit 1 and an upper second mounting unit 2, wherein the first mounting unit 1 may provide a pivot point 4 of the base station antenna 10, and the second mounting unit 2 may have an adjustable effective connection length for the base station antenna 10, with the effective connection length related to the mechanical tilt angle of the base station antenna 10. Depending on the weight of the base station antenna 10, a third mounting unit may be additionally provided between the first mounting unit 1 and the second mounting unit 2 for additionally connecting the base station antenna 10 and the supporting member 11. The third mounting unit may be constructed similarly to the second mounting unit and have an adjustable effective connection length.

The second mounting unit 2 may have two articulating arms 5 and 6, which may be hinged to each other, wherein one of the articulating arms 5 is hinged to a clamping device that can be fixed on the supporting member 11, and the other articulating arm 6 is hinged to an appendage on the radome of the base station antenna 10. When the two articulating arms 5 and 6 are fixed to each other, the corresponding effective connection length may be determined, and the corresponding mechanical tilt angle of the base station antenna 10 may thus be determined. The "effective connection length" herein can be understood as the effective connection length of the adjustable connection mechanism including the two articulating arms 5 and 6: that is, the distance between the articulating arm 5 and the hinged part 12 of the clamping device on the one hand and the distance between the articulating arm 6 and the hinged part 18 of the mounting plate 17 on the other hand. The fixing of the articulating arms 5 and 6 to each other can be realized by fasteners, in particular bolts. When adjusting the mechanical inclination angle of the base station antenna 10, the fasteners are first loosened so that the two articulating anns 5 and 6 can pivot relative to each other; next, the base station antenna 10 is rotated around the pivot point 4 to the desired mechanical tilt angle; finally, the fasteners are re-tightened so that the base station antenna 10 is maintained in the desired mechanical tilt angle.

The mounting device comprises an elastic element 3 configured to resist an increase in the mechanical tilt angle of the base station antenna 10 over at least a part of the adjustable range of the mechanical tilt angle of the base station antenna. For example, the neutral position of the elastic element 3 may correspond to a mechanical tilt angle of −3°, 0°, 3°, or 5° of the base station antenna 10, and the elastic element 3 is in a relaxed state in the neutral position. In the process of adjusting the base station antenna 10 from the mechanical tilt angle corresponding to the neutral position of the elastic element to a larger mechanical tilt angle, the elastic element 3 generates a restoring force that increases as the mechanical tilt angle increases, and the torque generated by the restoring force can at least partially resist the torque generated by the gravity of the base station antenna 10. Therefore, the operator only needs to apply a reduced force to the base station antenna 10 to make the base station antenna 10 in a state of balanced forces. In addition, the elastic element 3 can prevent the base station antenna 10 from falling uncontrollably during the process of adjusting the mechanical tilt angle. The elastic element 3 may be a spring, such as a tension spring, a compression spring or a torsion spring. In the embodiment shown in FIG. 2 and FIG. 3, the elastic element 3 is a torsion spring, which is mounted to the first mounting unit 1, specifically, to the hinged part of the first mounting unit 1 that provides the pivot point 4. Alternatively, or additionally, the torsion spring may also be mounted to at least one of the three hinged parts of the second mounting unit 2, for example, to the hinged part between the two articulating arms 5 and 6 of the second mounting unit 2.

As shown in FIG. 2 and FIG. 3, the two components 7 and 8 connected through the hinged part of the first mounting unit 1 pivot relative to each other when the base station antenna 10 pivots around the pivot point 4. The component 7 can be fixed to the clamping member of the clamping device. The component 8 may be an accessory (e.g., a bracket) for fastening to the radome of the base station antenna. The two components 7 and 8 may have aligned mounting holes, the torsion spring may have at least one coil, the torsion spring may be installed between the two components 7 and 8, and a pin 9 acting as a pivot shaft may pass through the aligned mounting holes of the two components 7 and 8 and at least one coil of the torsion spring. The two components 7 and 8 may have flanges flanges 13 and 14, respectively, and the two spring arms 15 and 16 of the torsion spring are respectively blocked against one of the flanges 13 and 14 of the two components 7 and 8. The relative pivotal movement of the two components 7 and 8 connected by the hinged part of the first mounting unit 1 is capable of causing the relative movement of the two spring arms 15 and 16 of the torsion spring. Specifically, as the mechanical tilt angle of the base station antenna increases, the two spring arms 15 and 16 are pulled away from each other by the two flanges 13 and 14.

As shown in FIG. 2, the two components 7 and 8 may each have a torsion spring on both sides in the depth direction. In FIG. 2, only one torsion spring on one side is depicted.

Similarly, if a torsion spring is provided in the hinged part between the two articulating arms 5 and 6 of the second mounting unit 2, the two spring anns of the torsion spring can be pulled apart by the two articulating arms 5 and 6 as the mechanical tilt angle of the base station antenna 10 increases.

In some embodiments that are not shown, the adjustable effective connection length of the second mounting unit can also be achieved by a telescopic rod set, which includes at least two rods, one of which may be extended into and pulled out from the other rod. An elastic element such as a tension spring can resist the pulling of the rods relative to each other.

In some embodiments that are not shown, the adjustable effective connection length of the second mounting unit can also be achieved by a parallelogram mechanism (e.g., a four-bar linkage), wherein one corner of the parallelogram mechanism is connected to a clamping device, one corner opposite to it is connected to the base station antenna, and a compression spring is provided as an elastic element between the other two corners.

Figure 4:
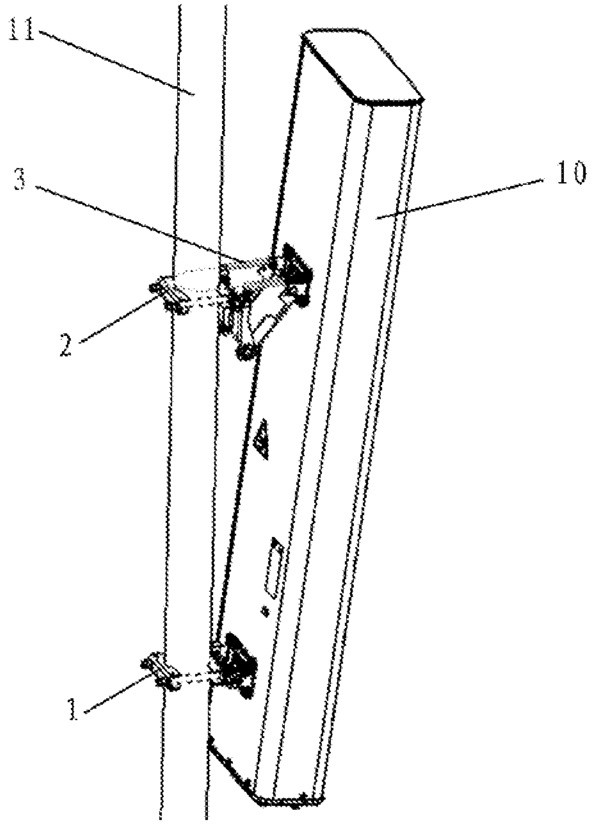
FIG. 4 is a perspective view of a base station antenna mounted on a supporting member via the mounting device according to the second embodiment of the present disclosure.
Figure 5:
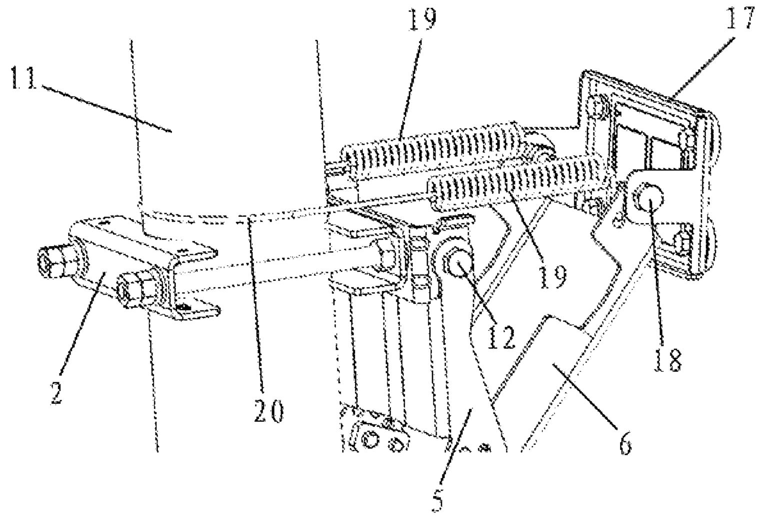
FIG. 5 is a partially enlarged perspective view of the system of FIG. 4 in the area of the second mounting unit.

Next, the mounting device according to the second embodiment of the present disclosure will be described with reference to FIG. 4 and FIG. 5, wherein FIG. 4 is a perspective view of the base station antenna 10 being mounted on the supporting member 11 via the mounting device according to the second embodiment of the present disclosure, and FIG. 5 is a partially enlarged perspective view of the system of FIG. 4 in the area of the second mounting unit 2.

In the second embodiment, the mounting device may comprise a first mounting unit 1 and a second mounting unit 2 configured in the same or similar manner as in the first embodiment. The difference between the second embodiment and the first embodiment may mainly lie in the composition and arrangement of the elastic element 3.

In the second embodiment, the elastic element 3 may be configured as a spring device, and is allocated to the upper second mounting unit 2. The spring device may comprise two tension spring segments 19 and a steel wire segment 20 connecting the two tension spring segments 19. The steel wire segment 20 may hold the supporting member 11 from the rear, and the spring device may be directly or indirectly connected with the base station antenna via two free ends. As shown in FIG. 4 and FIG. 5, the two free ends of the spring device can be fixed on the hinged part 18 between the mounting plate 17 and the articulating arm 6, and the mounting plate 17 can be directly fixed to the radome of the base station antenna 10. The spring device may be designed to be in a neutral position at a mechanical tilt angle of 0° (which may mean that the central longitudinal axis of the base station antenna 10 is in a vertical orientation, or is perpendicular to the ground). When adjusting the mechanical tilt angle of the base station antenna, as the mechanical tilt angle increases, the angle between the two articulating arms 5 and 6 increases, and the two tension spring sections 19 are stretched. Therefore, the spring device provides an increased spring force, which is capable of at least partially resist the gravitational force of the base station antenna itself, so that the operator only needs to apply a small force to the base station antenna to make the base station antenna in a state of balanced forces.

Figure 6:
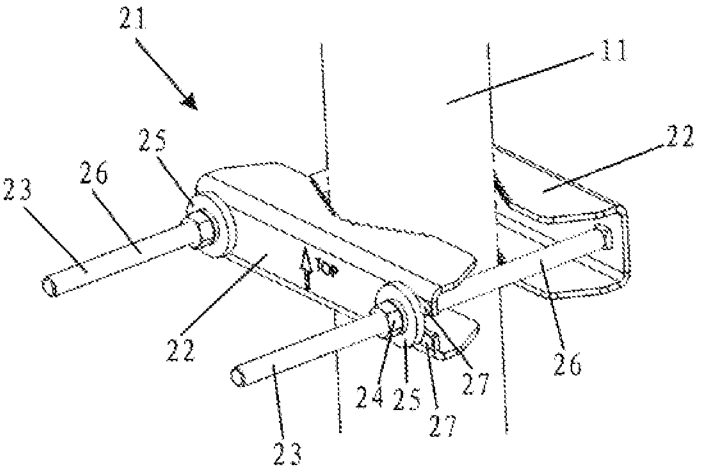
FIG. 6 is a schematic perspective view of the clamping device according to the first embodiment in an installed state.
Figure 7:
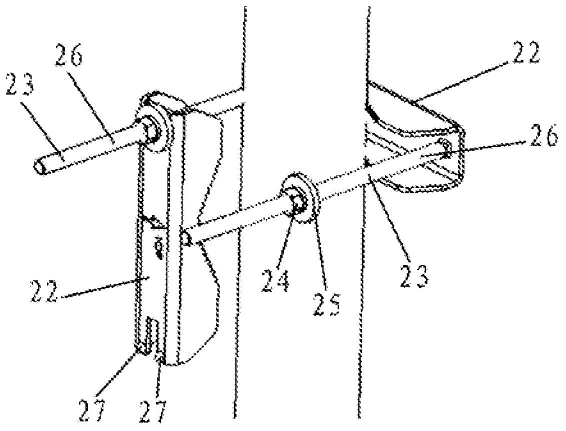
FIG. 7 is a schematic perspective view of the clamping device of FIG. 6 in a loosened state.
Figure 8:
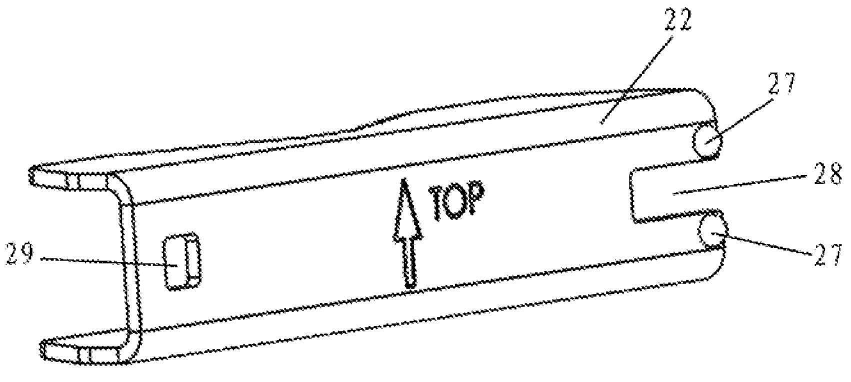
FIG. 8 is a perspective view of a clamping member of the clamping device of FIG. 6.

Next, the clamping device 21 according to the first embodiment will be described with reference to FIG. 6 to FIG. 8. The clamping device may be an integral part of any of the mounting units 1 and 2 of the mounting device shown in FIG. 1 to FIG. 5. However, the clamping device 21 shown in FIG. 6 to FIG. 8 can also be applied separately. FIG. 6 depicts the clamping device 21 in the installed state, FIG. 7 shows the clamping device 21 in the released state, and FIG. 8 depicts a perspective view of a clamping member 22 of the clamping device 21.

The clamping device 21 comprises a pair of clamping members 22 and a pair of bolt devices 23, and the bolt devices 23 are used on both sides of the supporting member 11 to clamp the clamping members 22 to each other and thereby fasten the clamping members 22 to the supporting member 11. For example, a clamping member 22 behind the supporting member 11 may have a conventional mounting hole 29 and a laterally open-ended mounting hole 28 for the bolting device. The mounting hole 28 is configured to allow the bolt rod 26 of the bolt device 23 to enter and exit the mounting hole 28 on the side when the nut 24 of the bolt device 23 is loosened. Therefore, when removing or installing the clamping device 21, it is not necessary to completely unscrew the nut 24 from the bolt rod 26, but only to loosen the nut 24 and maintain it on the bolt rod 26. In order to prevent the bolt rod 26 from accidentally escaping from the side of the mounting hole 28 when the bolt device 23 is tightened, the mounting hole 28 may have an obstructing member. In the embodiment shown in FIG. 6 to FIG. 8, the mounting hole 28 is provided with two protrusions 27 as obstructing members, and the protrusions 27 are configured such that, when the bolt device 23 is tightened, the nut 24 for obstruction purposes is pressed against the washer 25 sleeved on the bolt rod 26 of the clamping member 22, so that the bolt rod 26 remains in the mounting hole 28. The protrusions 27 may be, for example, solder bumps or joints in a region of the clamping member 22 adjacent to the mounting hole 28. As an alternative to the solder joints, positioning screws may also be screwed into the clamping member 22 as the protrusions 27. In order to prevent errors during mounting, the clamping member 22 may be provided with symbols and/or letters on the back. In the embodiment shown, the clamping member 22 has an arrow symbol on the back and the letters "TOP" next to the arrow symbol.

Figure 9:
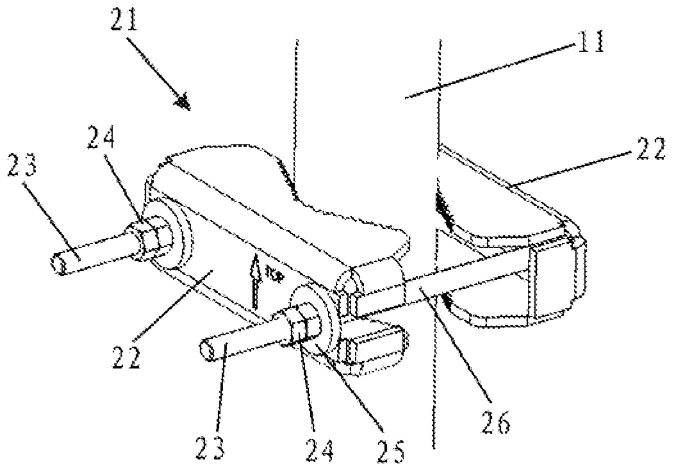
FIG. 9 is a schematic perspective view of the clamping device according to the second embodiment in an installed state.
Figure 10:
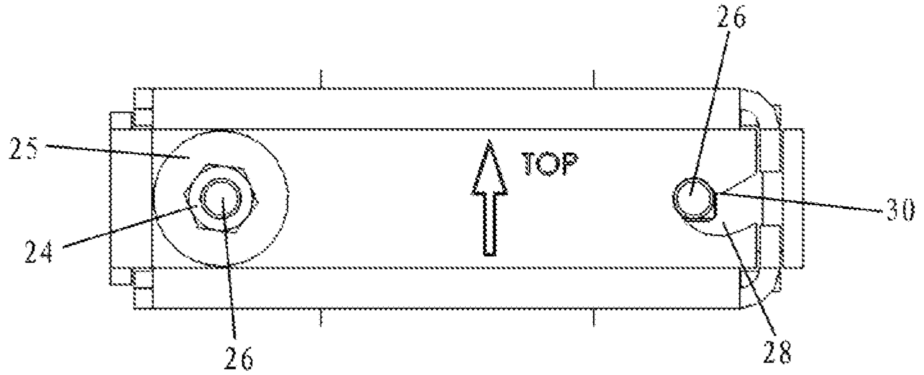
FIG. 10 is a view of the clamping device of FIG. 9 as viewed from the back of the holding pole.
Figure 11:
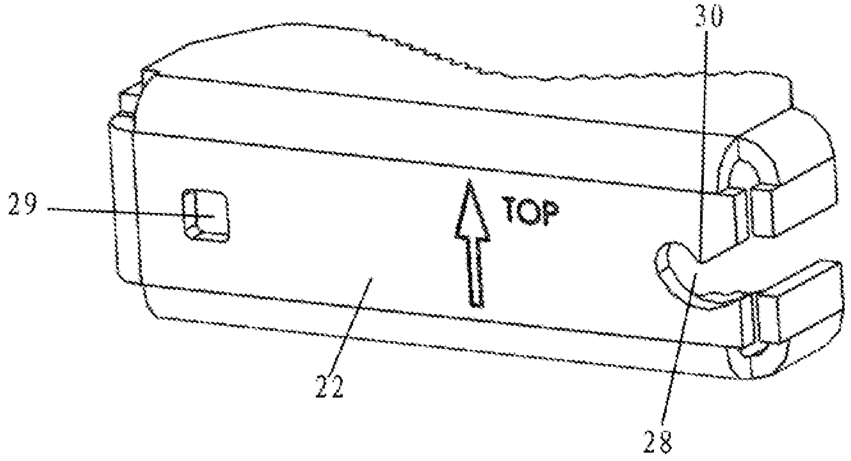
FIG. 11 is a perspective view of a clamping member of the clamping device of FIG. 9.

Finally, the clamping device 21 according to the second embodiment is described with reference to FIG. 9 to FIG. 11. The clamping device may be an integral part of any of the mounting units 1 and 2 of the mounting device shown in FIG. 1 to FIG. 5. However, the clamping device shown in FIG. 9 to FIG. 11 may also be applied separately. FIG. 9 is a schematic diagram of the clamping device 21 in an installed state; FIG. 10 is a view of the clamping device 21 of FIG. 9 viewed from the back of the supporting member 11, in which the nut 24 and the spacer 25 of the bolt device 23 that is matched with the open mounting hole 28 are omitted; FIG. 11 is a perspective view of a clamping member 22 of the clamping device 21 of FIG. 9.

In this embodiment, the laterally extending channel of the mounting hole 28 has a corner 30 that serves as a stop member. In the tightened state, the corner 30 can prevent the bolt rod 26 from accidentally escaping from the open mounting hole 28. In the loosened state, the bolt rod 26 can pass over the corner 30 and leave the mounting hole 28 through the laterally extending channel of the mounting hole 28, or can pass over the corner 30 through the laterally extending channel of the mounting hole 28 to reach the predetermined mounting position as shown in FIG. 10.

It should be noted that the terminology used here is only for the purpose of describing specific aspects, and not for limiting the disclosure. The singular forms "a" and "the one" as used herein shall include plural forms, unless the context explicitly states otherwise. It can be understood that the terms "including" and "inclusive" and other similar terms, when used in the application documents, specify the existence of the stated operations, elements and/or components, and do not exclude the existence or addition of one or more other operations, elements, components and/or combinations thereof. The term "and/or" as used herein includes all of any combinations of one or more relevant listed items. In the description of the attached drawings, similar reference numerals always indicate similar elements.

The thickness of the elements in the attached drawings may be exaggerated for clarity. In addition, it can be understood that if an element is referred to as being on, coupled to, or connected to, another element, then the said element may be directly formed on, coupled to, or connected to the other element, or there can be one or more intervening elements between them. Conversely, if the expressions "directly on", "directly coupled to" and "directly connected to" are used herein, it means that there are no intervening elements. Other words used to describe the relationship between elements should be interpreted similarly, such as "between" and "directly between", "attached" and "directly attached", "adjacent" and "directly adjacent" and so on.

Terms such as "top", "bottom", "upper", "lower", "above", "below", etc. herein are used to describe the relationship of one element, layer or region with respect to another element, layer or region as shown in the attached drawings. It can be understood that in addition to the orientations described in the attached drawings, these terms should also include other orientations of the device.

It can be understood that although the terms "first", "second", etc. may be used herein to describe different elements, these elements should not be limited by these terms. These terms are only used to distinguish one element from another. Therefore, the first element can be referred to as the second element without departing from the teachings of the concept of the present disclosure.

It may also be considered that all the exemplary embodiments disclosed herein may be arbitrarily combined with each other.

Finally, it should be pointed out that the aforementioned embodiments are only used to understand the present disclosure, and do not limit the protection scope of the present disclosure. For those of ordinary skill in the art, modifications can be made on the basis of the aforementioned embodiments, and these modifications do not depart from the protection scope of the present disclosure.

The invention claimed is:

1. A mounting device configured for mounting a base station antenna on a supporting member, the mounting device comprising:

a first mounting unit secured to a lower portion of the base station antenna and configured to provide a pivot point for the base station antenna via a mechanical connection to the supporting member, a second mounting unit secured to the supporting member and an upper portion of the base station antenna, the second mounting unit comprising two articulating arms configured to pivot relative to each other and having an adjustable effective connection length related to a mechanical tilt angle of the base station antenna, and an elastic element mounted on a hinged part of the first mounting unit, the elastic element being a spring, wherein the elastic element is configured to resist an increase in the mechanical tilt angle of the base station antenna on a part of an adjustable range of the mechanical tilt angle of the base station antenna.

2. The mounting device according to claim 1, wherein the spring is a tension spring, a compression spring or a torsion spring.

3. The mounting device according to claim 2, wherein the spring is a torsion spring mounted to the hinged part of the first mounting unit that provides the pivot point, wherein the relative movement of two components connected through the hinged part of the first mounting unit causes the relative movement of two spring arms of the torsion spring.

4. The mounting device according to claim 3, wherein the two components have aligned mounting holes, the torsion spring has at least one coil, the torsion spring is installed between the two components, and a pin acting as a pivot shaft passes through the aligned mounting holes of the two components and at least one coil of the torsion spring.

5. The mounting device according to claim 3, wherein the two components have flanges respectively, and the two spring arms of the torsion spring are respectively blocked against one of the flanges of the two components.

6. A mounting device configured for mounting a base station antenna on a supporting member, the mounting device comprising:

a first mounting unit configured to provide a pivot point for the base station antenna, a second mounting unit, and an elastic element, the elastic element configured as a spring device comprising two tension spring segments and a steel wire segment connecting the two tension spring segments, with the steel wire segment configured to hold the supporting member from the rear, and the spring device configured to be directly or indirectly connected to the base station antenna via two free ends, wherein the second mounting unit has an adjustable effective connection length for the base station antenna, with the effective connection length related to a mechanical tilt angle of the base station antenna, and the elastic element is configured to resist an increase in the mechanical tilt angle of the base station antenna on a part of an adjustable range of the mechanical tilt angle of the base station antenna.

7. The mounting device according to claim 1, wherein the elastic element is configured to generate a restoring force that increases as the mechanical tilt angle increases.

8. The mounting device according to claim 7, wherein the restoring force generates a torque configured to partially resist a torque generated by gravity of the base station antenna.

* * * * *